| United States Patent [19] | [11] Patent Number: 4,612,015 |
|---|---|
| Dyllick-Brenzinger | [45] Date of Patent: Sep. 16, 1986 |

[54] LIQUID DYE FORMULATIONS CONTAINING ORGANIC CARBONATES

[75] Inventor: Rainer Dyllick-Brenzinger, Weinheim, Fed. Rep. of Germany

[73] Assignee: BASF Aktiengesellschaft, Rheinland-Pfalz, Fed. Rep. of Germany

[21] Appl. No.: 752,597

[22] Filed: Jul. 8, 1985

[30] Foreign Application Priority Data

Jul. 11, 1984 [DE] Fed. Rep. of Germany ....... 3425512

[51] Int. Cl.[4] .................... C09B 67/44; C09D 11/02
[52] U.S. Cl. ............................... 8/527; 8/576; 8/657; 8/938; 8/521
[58] Field of Search ............................ 8/527, 576, 938

[56] References Cited

U.S. PATENT DOCUMENTS

| 3,558,260 | 1/1971 | Hermes | 8/533 |
| 3,988,109 | 10/1976 | Schuierer | 8/505 |
| 4,290,766 | 9/1981 | Burns et al. | 8/491 |

FOREIGN PATENT DOCUMENTS 59-223765 12/1984 Japan .

*Primary Examiner*—A. Lionel Clingman
*Attorney, Agent, or Firm*—Oblon, Fisher, Spivak, McClelland & Maier

[57] ABSTRACT

Novel liquid dye formulations which contain organic carbonates in addition to conventional components are very useful for dyeing organic substrates.

4 Claims, No Drawings

LIQUID DYE FORMULATIONS CONTAINING ORGANIC CARBONATES

The present invention relates to liquid dye formulations which contain organic carbonates in addition to conventional components.

For the purposes of the present invention, organic carbonates are compounds of the formula I or II

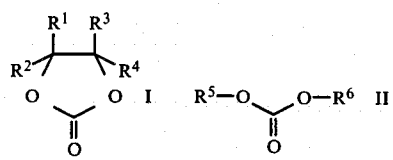

wherein $R^1$ to $R^6$ independently of one another are each hydrogen or unsubstituted or substituted alkyl, alkenyl or cycloalkyl, and $R^5$ and $R^6$ may furthermore be unsubstituted or substituted aryl.

Alkyl radicals $R^1$ to $R^6$ are of, in particular, 1 to 8 carbon atoms and can be substituted by, for example, chlorine, hydroxyl or $C_1$-$C_4$-alkoxy. Specific examples of radicals $R^1$ to $R^6$ are $CH_3$, $C_2H_5$, $C_2H_4Cl$, n—$C_3H_7$ and iso—$C_3H_7$, $C_3H_6Cl$, $CH_2$—$CH$=$CH_2$, $CH(CH_3)CH_2Cl$, n—$C_4H_9$ and iso—$C_4H_9$, $CH(CH_3)C_2H_5$, $C_4H_8Cl$, n—$C_5H_{11}$ and iso—$C_5H_{11}$, $CH_2C(CH_3)_3$, $C(CH_3)_2C_2H_5$,

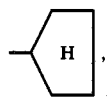

$C_6H_{13}$, $CH(CH_3)C_3H_7$, $CH(CH_3)CH(CH_3)_2$, $CH(CH_3)CH_2CH$=$CH_2$, $CH_2CH(CH_3)C_2H_5$, $CH_2CH(CH_3)CH(CH_3)_2$, $CH_2CH(C_2H_5)C_2H_5$, $CH_2CH(CH_3)C_3H_7$, $C_7H_{15}$, $CH(C_2H_5)C_4H_9$, $C_8H_{17}$, $CH_2CH(C_2H_5)C_4H_9$, $CH(CH_3)C_3H_6CH(CH_3)_2$, $C_2H_4OH$, $C_3H_6OH$, $C_4H_8OH$, $C_6H_{12}OH$, $C_2H_4OCH_3$, $C_2H_4OC_2H_5$, $C_2H_4OC_3H_7$, $C_2H_4OC_4H_9$, $C_2H_4OC_6H_5$, $C_2H_4OCH_2C_6H_5$, $C_2H_4OC_2H_4OH$, $C_2H_4OC_2H_4OCH_3$, $C_2H_4OC_2H_4OC_2H_5$, $C_2H_4OC_2H_4OC_3H_7$, $C_3H_6OC_2H_4OH$, $C_3H_6OC_4H_8OH$, $C_2H_4CH(OCH_3)CH_3$, $C_3H_6OCH_3$, $C_3H_6OC_2H_5$, $C_3H_6OC_3H_7$ and $C_3H_6OC_4H_9$.

Further examples of $R^5$ and $R^6$ are phenyl which is substituted by chlorine, methyl or methoxy, and in particular unsubstituted phenyl.

The compound of the formula

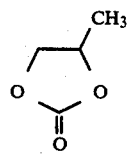

is especially preferred, in particular because of its availability.

Dyes which may be present in the formulations are, in particular, non-polar compounds, such as the products listed in the Color Index under the heading Solvent Dyes, as well as, for example, laked basic dyes and amine salts of anionic dyes.

Because the compounds of the formulae I and/or II generally have poor water solubility, they are advantageously used only as an additive to essentially anhydrous dye formulations. However, the said compounds can also be used as the sole solvent. Surprisingly, we have found that, in particular, the shelf life of formulations containing compounds of the formulae I and/or II is very greatly improved, this being especially noticeable at $<0°$ C. No precipitation or crystallization occurs, even after prolonged storage.

The compounds of the formulae I and/or II are usually added in amounts of from 1 to 80%, preferably from 3 to 20%, and the most advantageous amount can readily be determined by preliminary experiments.

The novel dye formulations are very useful for dyeing, for example, solvents, mineral oil products, coatings and printing inks.

EXAMPLE 1

A solution of 65 parts of a dye prepared by mixing coupling of a diazotized aromatic amine mixture of the formulae

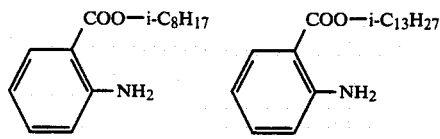

to

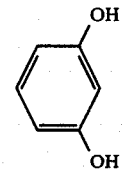

in 28 parts of a mixture of aliphatic and aromatic compounds (Shellsol ®AB) and 7 parts of

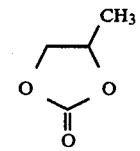

were stirred for 6 weeks at 0° C. (Fina test). During this time, no precipitates or crystals formed and the solution remained completely clear. A similar test without the addition of propylene carbonate resulted in significant precipitation after only 14 days.

EXAMPLE 2

A solution of 32.5 parts of a dye mixture consisting of 85 parts of the compound of the formula

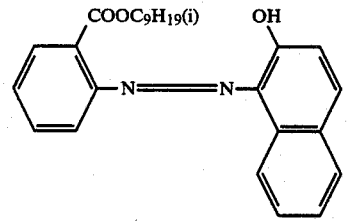

and 15 parts of the compound of the formula

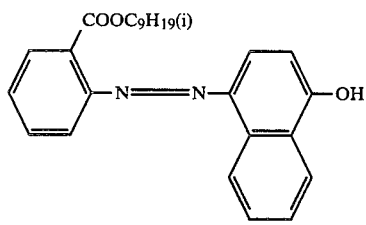

in 14.5 parts of Shellsol AB and 3.5 parts of propylene carbonate were stirred for 3 weeks at 0° C. During this time, no precipitates or crystals formed, and the solution remained completely clear. Noticeable crystallization occurred only on further stirring of the mixture at 0° C.

Increasing the concentration of the propylene carbonate, at the expense of the Shellsol AB, to 10 parts or more gave a stable liquid formulation. Even after 6 weeks, no crystallization was detectable. When diphenyl carbonate was employed instead of propylene carbonate, improved stability of the liquid formulation at 0° C. was likewise observed. However, the solubility of diphenyl carbonate in Shellsol AB is limited, in contrast to that of propylene carbonate.

In an experiment similar to that described above, in which the 3.5 parts of propylene carbonate were replaced with Shellsol AB, significant crystallization occurred after only one week.

When dye mixtures were used in which the ratios were varied within the stated limits

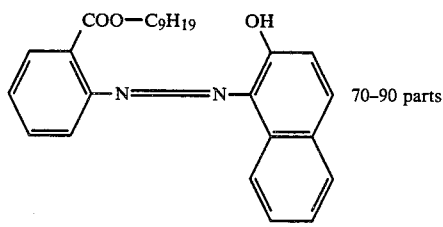
70–90 parts

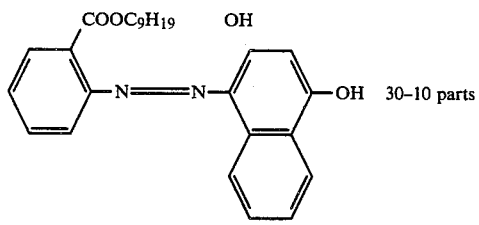
30–10 parts the addition of similar amounts of propylene carbonate likewise gave liquid formulations having a long shelf life.

In the case of these dye mixtures, too, the shelf life of the solutions can be further prolonged by increasing the amounts of propylene carbonate (replacing the Shellsol AB).

EXAMPLE 3

A solution of 60 parts of the dye of the formula

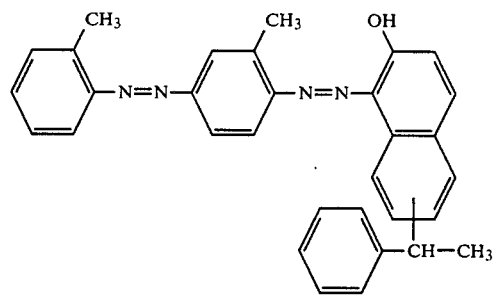

and 40 parts of Shellsol AB was stirred for 3 weeks at 0° C. After this time, substantial precipitation from the solution was observed.

When a solvent mixture consisting of 10 parts of propylene carbonate and 30 parts of Shellsol AB was used, the liquid formulation obtained was stable for 6 weeks at 0° C.

EXAMPLE 4

A solution of 60 parts of the dye of the formula

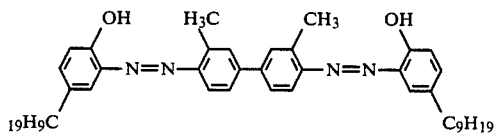

and 40 parts of Shellsol AB was stirred for 4 weeks at 0° C. After this time, significant precipitation from the solution was observed.

Changing the solvent mixture to 7 parts of propylene carbonate and 33 parts of Shellsol AB gave a liquid formulation which was stable for 7 weeks or longer at 0° C.

EXAMPLE 5

A solution of 60 parts of the dye of the formula

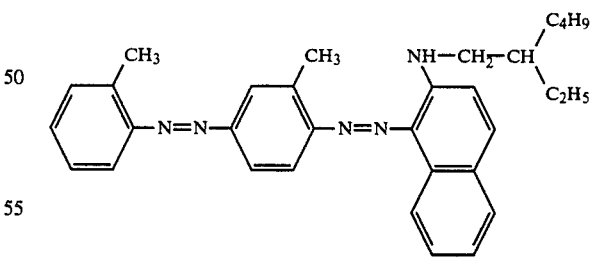

and 40 parts of Shellsol AB was stirred for 30 days at 0° C. After this time, significant precipitation from the solution was observed.

Changing the solvent mixture (10 parts of propylene carbonate and 30 parts of Shellsol AB) gave a liquid formulation which was stable for 7 weeks at 0° C.

EXAMPLES 6 TO 8

Similar experiments with the dyes of the formulae

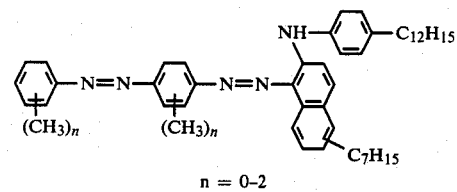

(mixture of homologs)

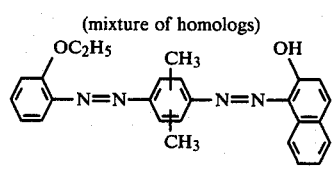

(isomer mixture)

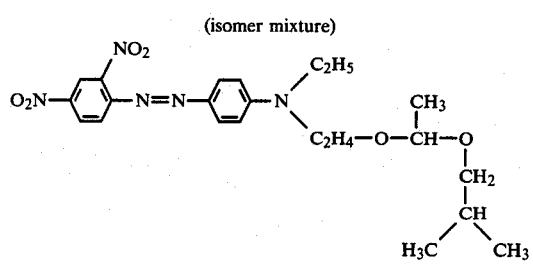

Likewise gave liquid formulations having an improved shelf life at 0° C.

EXAMPLE 9

A solution of 25 parts of a dye mixture of the formulae (NO₂ in 4- or 5-position)

in 55 parts of 1-methoxypropan-2-ol and 20 parts of n-butyldiethylene glycol was stirred for 14 days at 0° C. During this time, significant crystallization occurred. a similar experiment in which 15 parts of the 1-methoxypropan-2-ol were replaced with 15 parts of propylene carbonate did not result in any precipitation at 0° C. even after 4 weeks.

EXAMPLE 10

A solution of 25 parts of a dye mixture obtained by cobaltizing the dyes of the formulae and (as sodium salts)

in 55 parts of 1-methoxypropan-2-ol and 20 parts of n-butyldiethylene glycol was stirred for 10 days at 0° C. During this time, significant crystallization occurred. A similar experiment in which 20 parts of 1-methoxypropan-2-ol were replaced with 20 parts of propylene carbonate did not result in any precipitation at 0° C. even after 4 weeks.

EXAMPLE 11

A solution of 50 parts of the dye of the formula in 120 parts of propylene carbonate was satisfactory even after storage for several weeks at 0°, 20° and 60° C., ie. no precipitates at all formed.

EXAMPLE 12

A solution of 50 parts of the dye of the formula in 120 parts of propylene carbonate was still free of precipitates even after storage for several weeks at 0°, 20° and 60° C.

EXAMPLE 13

A solution of 10 parts of the dye of the formula

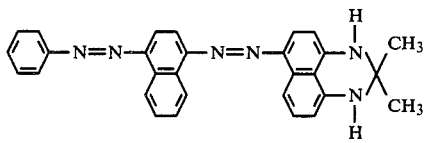

in 120 parts of propylene carbonate was stable even after storage for several weeks at temperatures down to 0° C.

EXAMPLE 14

A solution of 15 parts of the dye of the formula

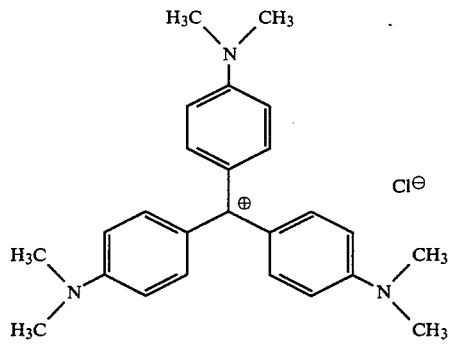

in 120 parts of propylene carbonate did not form any precipitates even after storage for several weeks at 0°, 20° and 60° C.

We claim:

1. A liquid dye formulation comprising solvent soluble azo dye and an organic cabonate in an amount sufficient to stabilize said formulation against crystallization and precipitation after storage, said formulation having been stored for at least 3 weeks.

2. A dye formulation as claimed in claim 1, which contains, as the organic carbonate, the compound of the formula

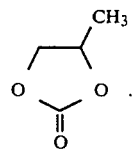

3. A method for preventing crystallization and precipitation to occur in a liquid dye formulation comprising a solvent soluble azo dye upon storage which comprises adding thereto an amount of an organic carbonate effective to prevent said crystallization and precipitation to occur for a prolonged period of time.

4. A method according to claim 3 wherein the organic carbonate is a compound of the formula

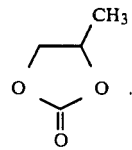

* * * * *